United States Patent [19]
Namiki

[11] Patent Number: 5,553,178
[45] Date of Patent: Sep. 3, 1996

[54] LASER MODULE USING ASYMMETRICAL LENS

[75] Inventor: Shu Namiki, Tokyo, Japan

[73] Assignee: The Furukawa Electric Co., Ltd., Tokyo, Japan

[21] Appl. No.: 150,194

[22] PCT Filed: Apr. 6, 1993

[86] PCT No.: PCT/JP93/00446

§ 371 Date: Apr. 22, 1994

§ 102(e) Date: Apr. 22, 1994

[87] PCT Pub. No.: WO93/20468

PCT Pub. Date: Oct. 14, 1993

[30] Foreign Application Priority Data

Apr. 6, 1992 [JP] Japan ................... 4-113089

[51] Int. Cl.⁶ .................... G02B 3/02; G02B 6/32
[52] U.S. Cl. ............................ 385/33; 359/720
[58] Field of Search ..................... 359/668, 720, 359/718, 719, 710, 652; 385/33, 31

[56] References Cited

U.S. PATENT DOCUMENTS 4,961,622 10/1990 Gorman et al. ............ 385/33
5,159,491 10/1992 Richards ............... 395/720 X

FOREIGN PATENT DOCUMENTS 54-21750 2/1979 Japan .
57-176014 10/1982 Japan .

*Primary Examiner*—John D. Lee
*Attorney, Agent, or Firm*—Jacobson, Price, Holman & Stern, PLLC

[57] ABSTRACT

The present invention provides an asymmetrical lens showing different sets of optical characteristics as projected on two planes that are parallel to the optical axis of the lens and perpendicular to each other and satisfying the following simultaneous system of equations.

$$(w\perp 2)/(w\perp 1) = (f\perp 2)/(f\perp 1) \qquad [2]$$

$$(w\|2)/(w\|1) = (f\|2)/(f\|1) \qquad [3]$$

$$(d\perp 1) = |(s\perp 1)|(s\|1) \qquad [4]$$

$$(d2) = |(s\perp 2) - (s\|2) \qquad [5]$$

Since the asymmetry of an asymmetrical lens according to the invention is clearly defined by a given simultaneous system of equations, it can be effectively used to optically couple optical waveguides with a low optical loss level if the optical waveguides operate with different waveguide modes, if the waveguide modes of the optical waveguides are not similar relative to one another, if the optical waveguides have mutually different sets of optical characteristics or even if the optical waveguides show astigmatism in their respective radiation patterns.

5 Claims, 5 Drawing Sheets

LASER MODULE USING ASYMMETRICAL LENS

BACKGROUND OF THE INVENTION

1. Field of the Invention

This invention relates to an asymmetrical lens adapted to optically couple optical waveguides having different optical characteristics with a low optical loss level.

2. Prior Art

As the single mode optical fiber gains popularity in the field of optical telecommunications and other optical technologies, there has been an ever increasing demand for optically coupling an optical fiber and other optical waveguides having a configuration different from that of the optical fiber such as semiconductor laser devices and/or thin film optical waveguides particularly in the field of advanced optical telecommunications network.

Any two optical waveguides can be mutually connected by means of a rotatably symmetric lens such as a spherical lens or a nonspherical lens as long as they show an optical intensity distribution of waveguide mode which is rotatably symmetric relative to the optical axis that operates as the axis of symmetry on a plane perpendicular to the optical axis.

Such optical connection can be realized with a low optical loss level because the optical elements involved in the optical connection have an identical waveguide mode.

On the contrary, optical connection of any following combinations of optical waveguides has not been technically feasible without producing a significant optical loss:

(1) an optical waveguide operational with a waveguide mode having the above defined symmetry, e.g., an optical waveguide showing a rotatably symmetric circular beam pattern (axis of symmetry: optical axis), and an optical waveguide operational with a waveguide mode having no such symmetry, e.g., an optical waveguide showing an elliptic beam pattern which is not rotatably symmetric, (2) two optical waveguides showing respective elliptic beam patterns that are not similar to each other in terms of mode configuration, and (3) two optical waveguides showing astigmatism along vertical and horizontal directions of radiation pattern.

Currently, a cylindrical lens, a prism or another rotatably symmetric lens is used in such a way that the lens is inclined by a given angle relative to the optical axis in order to accommodate itself to the above described combinations of optical waveguides. However, such an arrangement is inevitably accompanied by a significant optical loss.

Technological proposals using a rotatably asymmetric lens in an attempt to minimize the optical loss in coupling two optical waveguides that fall in one of the above defined combinations are found in published papers including Japanese Patent Laid-open Publications Nos. 62-191803 (hereinafter referred to as Paper No. 1) and 3-172801 (hereinafter referred to as Paper No. 2). However, none of these known techniques has succeeded in reducing the optical loss in optical connection.

The reason for this lies in the fact that none of those proposals does not provide a theory for designing a lens to be used for optically coupling two optical waveguides as defined in any of the above combinations (1) through (3).

Hence, no lenses, lens systems nor lens devices have so far been designed to minimize the optical loss in coupling two optical waveguides that fall in any of the above defined combinations (1) through (3) and meet the demand of constructing an advanced optical telecommunications network.

Now, some of the currently available theories for designing a lens and the status quo of the technology for producing a lens will be briefly discussed.

Optical waveguides used in advanced optical telecommunications networks are normally designed to operate in a transversal direction only with a fundamental waveguide mode for optical transmission as in the case of single mode optical fibers and buried type semiconductor laser devices.

In optical transmission using such optical waveguides, the waveguide mode is defined as a function of the first order Gaussian beam, which provides a significantly favorable approximation as described in Paper 3 as listed below.

Paper 3: "Introduction of Optical Electronics" A. Yariv; translated by Kunio Tada and Takeshi Kamiya, 1988, Maruzen K. K.

In an analysis using the first order Gaussian beams, equation [1] below provides a necessary and sufficient condition for a lens system of magnifying power m in order to establish an ideal connection between two optical waveguides that are similar to each other and have respective spot sizes w1 and w2 that are different from each other (provided that the numerical aperture NA of the lens system does not impose any restrictions on incident light). This is described in detail in Paper 4, listed below.

Paper 4: "The Basis and Application of Optical Coupling System for Optical Devices" Kenji Kohno, 1991, Gendaikogakusha.

$$m = w2/w1 \qquad [1]$$

With a ray tracing method, unlike a method utilizing Gaussian beams, the numerical aperture NA of each optical waveguide to be coupled in an optical system provides a condition to be met for optical connection along with the above described spot size.

However, such a ray tracing method cannot effectively be used for optical connection of optical waveguides, because it neglects parameters relating to the phase of light passing through each optical waveguide.

Incidentally, with a method utilizing Gaussian beams, the numerical aperture NA of each optical waveguide in an optical system is automatically, complementarily and unequivocally determined by the spot size of the optical waveguide because of constraints imposed on the phase of light.

In order to converge Gaussian beams to a small spot, the numerical aperture of an optical waveguide needs to have a relatively large value. This explains why the radiation angle NA of beams of light emitted from an optical waveguide having a large spot size is small.

In view of these, it will be apparent that a technique disclosed in the Paper 1 cannot theoretically optimize the optical connection between two optical waveguides because it deals with NA and image magnifying power independently in designing a lens system for the optical waveguides.

In other words, when two optical waveguides having different NA values are connected by way of a lens system, the spot formed by beams of light that are converged by the lens system will inevitably become larger on the part of the optical waveguide having a smaller NA than on the part of the other optical waveguide having a larger NA.

Thus, with a technique of the Paper 1, any two optical waveguides cannot be optimally connected with each other by means of a lens system.

While the Paper 2 proposes a technique for matching of two optical waveguides by means of a lens system having an optimized image magnifying power, it fails to take the spot size and location into consideration for optical waveguides.

In other words, with a technique proposed in the Paper 2, matching of image magnifying powers of a lens system for two planes (in vertical and horizontal directions) that are parallel to the optical axis of the lens system and perpendicular to each other is handled independently for each plane.

While the Paper 2 seems to reveal an intention to meet the condition of equation [1] if said two planes in vertical and horizontal directions are taken separately, it is not possible by any means to achieve an optimized status of connection simultaneously for both vertical and horizontal directions because the optimum spot (image forming spot) for a vertical direction is displaced from its counterpart for a horizontal direction.

Thus, a technique of the Paper 2 cannot optimally couple any two optical waveguides by way of a lens system.

Additionally, the fact the Paper 2 does not propose any technique for compensating astigmatism also evidences that it is not appropriate for providing optimum conditions in optically coupling optical waveguides.

SUMMARY OF THE INVENTION

In view of the above identified technological problems and other problems, it is therefore an object of the present invention to provide an asymmetrical lens that can be used for connection of optical waveguides that fall in any of the combinations as defined above in (1) through (3).

According to the present invention, the above object and other objects are achieved by providing an asymmetrical lens showing different sets of optical characteristics as projected on two planes that are parallel to the optical axis of the lens and perpendicular to each other and satisfying the following simultaneous system of equations.

$$(w\perp 2)/(w\perp 1) = (f\perp 2)/(f\perp 1) \quad [2]$$

$$(w\|2)/(w\|1) = (f\|2)/(f\|1) \quad [3]$$

$$(d1) = |(s\perp 1) - (s\|1)| \quad [4]$$

$$(d2) = |(s\perp 2) - (s\|2)| \quad [5]$$

where, ($f\perp 1$) and ($f\perp 2$) respectively represent the distances between the two principal surface planes of the lens as projected on one of the planes and the image forming spot (beam waist), being a symbol indicating a vertical direction, ($s\perp 1$) and ($s\perp 2$) respectively represent work distances corresponding to the above distances, ($f\|1$) and ($f\|2$) respectively represent the distances between the two principal surface planes of the lens as projected on the other planes and the image forming spot (beam waist), being a symbol indicating a horizontal direction, ($s\|1$) and ($s\|2$) respectively represent work distances corresponding to the above distances, ($w\perp 1$) and ($w\perp 2$) respectively represent the major and minor axes of the image forming spots having elliptic and/or circular forms on the light emitting terminals of the optical waveguides connected by way of the lens for matching of their respective waveguide modes, (d1) and (d2) respectively represents the degrees of astigmatism of the optical waveguides connected by way of the lens, and symbols "$\perp$" and "$\|$" denote the perpendicular and horizontal directions, respectively.

Thus, an asymmetrical lens according to the invention satisfies the necessary condition to be met for matching of the image magnifying powers of the lens for vertical and horizontal directions as defined by equations [2] and [3] in order to achieve an optimum connection of two optical waveguides and tile sufficient condition to be met for optimally coupling two optical waveguide simultaneously for both vertical and horizontal directions as expressed by equations [4] and [5].

Therefore, since an asymmetrical lens according to the invention satisfies all the equations [2] through [5], or differently stated, since it can optimally achieve matching of the image magnifying powers of the lens for vertical and horizontal directions and simultaneously realizes optical coupling for both vertical and horizontal directions, the optical waveguides coupled by such an asymmetrical lens can be brought to agreement of their corresponding terminal positions and the coupling point of the lens simultaneously for both vertical and horizontal directions and, additionally, the astigmatisms of the optical waveguides can be satisfactorily compensated.

The fact that an asymmetrical lens according to the invention provides optimum conditions for coupling optical waveguides that fall in any of the combinations as defined above in (1) through (3) may be proved by referring to the Paper 3 describing tile use of the first order Gaussian beams.

It should be noted here that dealing with conditions for a vertical direction and those for a horizontal direction independently is permissible within the scope of paraxial approximation and, if such a manner of dealing with conditions is not sufficiently permissible outside the scope of paraxial approximation, any possible discrepancies may be corrected to a certain extent by extrapolating-the underlying theory of the present invention.

Now, assuming that an asymmetrical lens for optically coupling optical waveguides according to the present invention comprises a lens elements operational for a vertical direction and another lens element operational for a horizontal direction, the two elements being configured differently relative to each other, such a lens needs to be proved to be three-dimensionally operational.

Obviously, the lens elements operational for a vertical direction and the one for a horizontal direction show respective sets of optical characteristics that are different from each other. First of all, the lens elements have respective focal lengths that are different from each other.

If the focal lengths for vertical and horizontal directions are ($f\perp$) and ($f\|$), respectively, the relationships between (f1) and (f2) and between (f1) and (f2) are respectively expressed by following equations [6] and [7], utilizing Newton's lens formula.

$$(1/f\perp) = (1/f\perp 1) + (1/f\perp 2) \quad [6]$$

$$(1/f\|1) = (1/f\|1) + (1/f\|2) \quad [7]$$

Therefore, when a lens system is designed, such a system is required to satisfy all the equations [2] through [7] simultaneously.

While equations [2] through [7] may not unequivocally define the configuration of a lens system, it may be optimally designed by appropriately taking additional factors into consideration.

For the purpose of the present invention, each of the lens elements for vertical and horizontal directions can be realized by combining spherical, cylindrical and other appropriate symmetrical planes.

If the astigmatism of each lens element may be neglected if it is sufficiently small relative to the work distance of the lens element. Alternatively, the wavefront aberration of each lens element can be satisfactorily compensated by using such spherical planes as reference planes, introducing an aspheriacal plane and adapting an astigmatism that meets actual operating conditions.

DESCRIPTION OF THE BEST MODES OF CARRYING OUT THE INVENTION

Now, the present invention will be described by referring to the accompanying drawings that illustrate preferred embodiments of the invention.

Figure 1A:
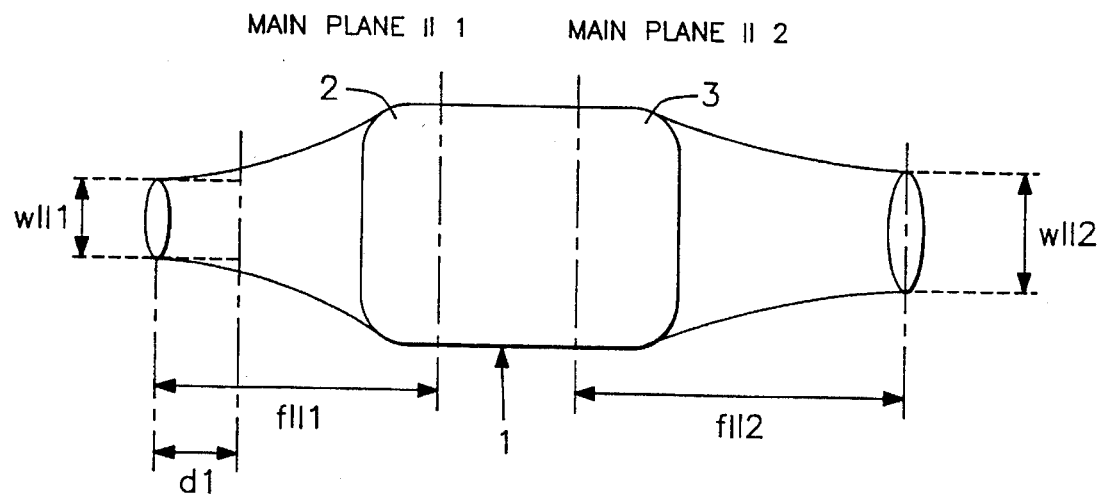
FIGS. 1 (a) and 1 (b) are respectively side and plan views of an asymmetrical lens according to the invention, schematically illustrating its concept.
Figure 1B:
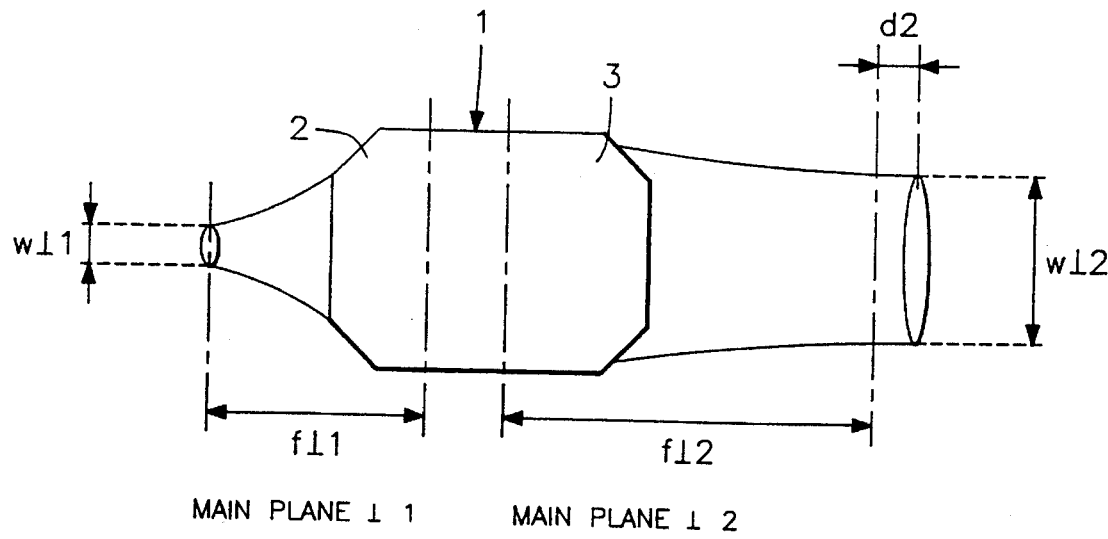

FIGS. 1 (a) and 1 (b) shows respectively side and plan views of an asymmetrical lens according to the invention, schematically illustrating its concept.

FIGS. 1 (a) and 1 (b) shows an asymmetrical lens 1 realized by combining a lens element for a vertical direction 2 and a lens element for a horizontal direction 3 along with mathematical terms fl, f2, fl, f2, wl, w2, wl, w2, d1 and d2 as defined above for equations [2] through [7].

Thus, equations [2] through [7] may be understood with ease by referring to FIGS. 1 (a) and 1 (b).

A lens device illustrated in FIGS. 2 (a) and 2 (b) comprises an asymmetrical lens 1 according to the invention and an ordinary lens 11, which are arranged along the optical axis of the device connecting a light source (semiconductor laser device) 21 and a single mode optical fiber 31.

Referring to FIGS. 2 (a) and 2 (b), bundled beams of light radiated from the light source 21 and having collectively an elliptic cross section are turned to parallel beams by the lens 11, although the bundled beams collectively maintain an elliptic cross section.

It is assumed here that the focal length of the lens 11 is by far greater than the astigmatism of the light source 21 and therefore the latter is negligible.

Figure 2A:
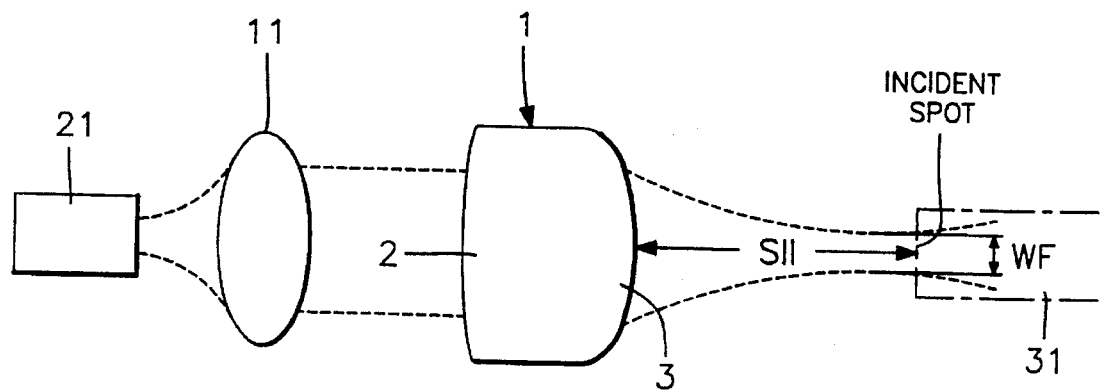
FIGS. 2 (a) and 2(b) are respectively side and plan views illustrating an exemplary lens device incorporating an asymmetrical lens according to the invention.
Figure 2B:
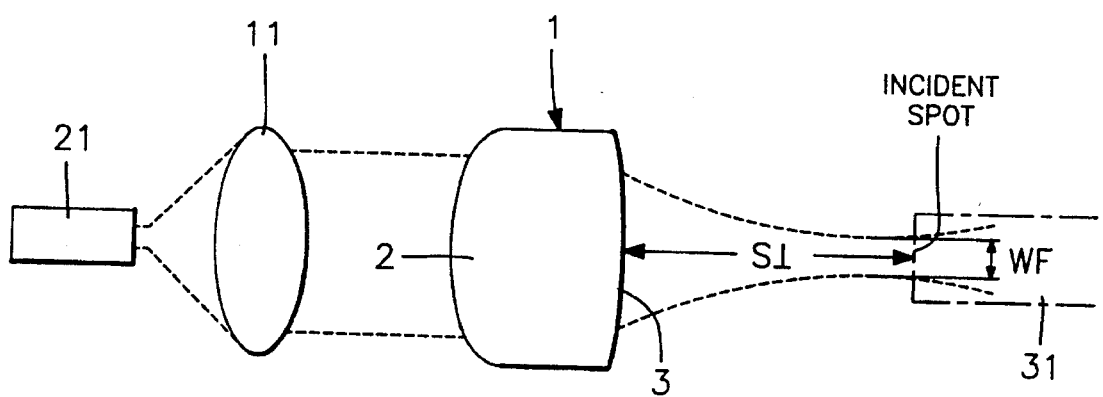

Referring to FIG. 2(a) and 2(b) again, parallel beams of light passing through the lens 11 are then converged by the asymmetrical lens 1 to form a circular spot.

If the focal lengths of the asymmetrical lens 1 in vertical and horizontal directions are expressed respectively by (f2) and (f2), the beam spots in vertical and horizontal directions respectively by (w⊥) and (w∥) and the beam spot of the optical fiber 31 is expressed by wF, then the optical connection covering the light source 21 and the single mode optical fiber 31 is optimized when following equations [8] and [9] hold true.

$$(f2\perp)=(wF/wL\perp)f \qquad [8]$$

$$(f2\|)=(wF/wL\|)f \qquad [9]$$

Note that equations [8] and [9] respectively correspond to equations [2] and [3] cited earlier.

Since an optical coupling lens device as illustrated in FIGS. 2 (a) and 2 (b) is realized on the basis of a pseudo-cofocal system comprising an asymmetrical lens 1 and an ordinary lens 11, the focal length of either lens may be deemed as the distance between the image forming point and tile principal surface plane. Now, an optical coupling lens device illustrated in FIGS. 2 (a) and 2 (b) needs to show matching of its wk k distances respectively corresponding to equations [4] and [5] cited above.

If the distances (work distances) from the lens 11 to the optical fiber 31 in vertical and horizontal directions are (s) and (s) respectively, matching of the work distances can be achieved when equation [10] below holds true because the astigmatism is negligible.

Figure 3A:
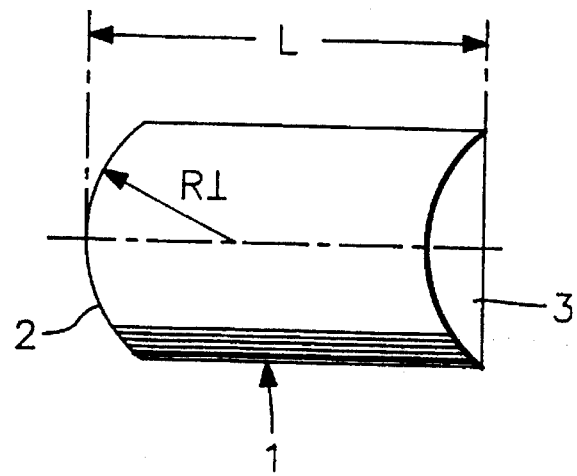
FIGS. 3(a), 3(b) and 3(c) are respectively plan, side and end views illustrating a preferred embodiment of asymmetrical lens of the invention.
Figure 3B:
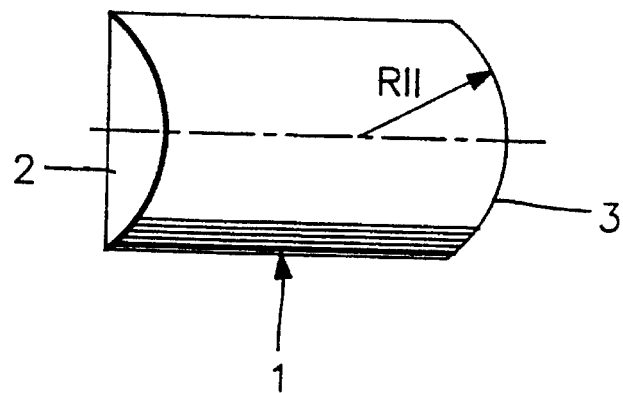
Figure 3C:
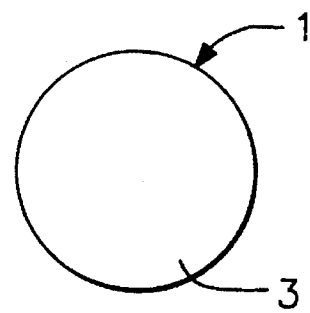

FIGS. 3(a) through 3(c) shows a preferred embodiment of asymmetrical lens according to the invention and satisfying the above requirements.

FIG. 3(a) is a plan view showing the vertical side (in a vertical direction) of the embodiment relative to light source 21 arranged on the optical axis and FIG. 3(b) is a side view showing the horizontal side (horizontal direction) of the embodiment relative to light source 21, whereas FIG. 3(c) is an end views showing the right hand side terminal of the embodiment.

The embodiment of asymmetrical lens 1 is a rod lens made of a material having index of refraction n.

As seen from FIGS. 3(a) through 3(c), the asymmetrical lens 1 has a convex light receiving surface plane (with radius of curvature R) for the vertical direction and a convex light emitting surface plane (with radius of curvature R) for the horizontal direction.

In other words, the asymmetrical lens 1 of FIGS. 3(a) through 3(c) has two curved planes that orthogonally intersect each other in vertical and horizontal directions.

The length L and the radii of curvature R⊥ and R∥ of such an asymmetrical lens 1 need to be expressed respectively by equations [11] through [13] below in order to meet the requirements of equations [8] through [10].

$$(R\perp)=(n-1)(wF/wL\perp)f \qquad [11]$$

$$(R\|)=(n-1)(wF/wL\|)f \qquad [12]$$

$$(L)=n(R\perp - R\|)/(n-1) \qquad [13]$$

An asymmetrical lens 1 that satisfies all the above described requirements produces an ideally circular mode pattern for beams of light coming from the lens 11 for both vertical and horizontal directions and the produced circular mode patterns have an identical spot size for both directions. Such beams of light are then introduced into optical fiber 31.

Thus, an elliptical beam pattern produced by light source 21 is highly efficiently modified to a circular beam pattern by an asymmetrical lens 1 as illustrated in FIGS. 3(a) through 3(c) so that the light source 21 may be effectively coupled with an optical fiber 31.

If, for example, a 0.98μm semiconductor laser device that emits bundled beams collectively having an elliptic cross section (longitudinal spot radius: 0.5μm, transversal spot radius: 1μm) is to be optimally coupled with a single mode optical fiber having a mode field radius of 3μm, then (R⊥)=2.1mm, (R∥)=1.1mm and (L)=3.0mm will be obtained, respectively, from the above equations [11] through [13] for an asymmetrical lens 1 that connects them, whereas n is set to be 1. 518.

A lens 11 having a focal length of 0.7mm will be used for such an arrangement.

If, on the other hand, a semiconductor laser device having a longitudinal spot radius of 0.5 μm and a transversal spot radius of 1.5μm is to be optimally coupled with a single mode optical fiber having the same particulars, then (R⊥)= 2.2mm, (R∥)=0.73mm and (L)=4.3mm will be obtained for an asymmetrical lens 1 connecting the above optical devices.

An asymmetrical lens 1 according to the invention may only be required to operate to produce beams of light parallel to the optical axis out of beams of light emitted from a semiconductor laser device 21.

Then, the locational arrangement of and the distance between the asymmetrical lens 1 and the lens 11, the positioning of the asymmetrical lens 1 relative to the semiconductor laser device 21 and other arranging operations may not require any rigorous adjustment to be carried out with thorough attention and it may be sufficient to work the asymmetrical lens 1 and the lens 11 to an ordinary level of precision so that the optical coupling lens device may be assembled with relative ease.

An asymmetrical lens according to the invention is not limited to the above embodiment and may be subjected to modifications.

More specifically, an asymmetrical lens according to the invention may have a configuration different from the above described one provided that it has an identical focal length and identical work distance for both vertical and horizontal directions and the focal length for vertical and horizontal directions is so selected that the lens forms an image having a spot size same as the circular mode of the optical fiber connected to it at a position separated by the above work distance.

Figure 4A:
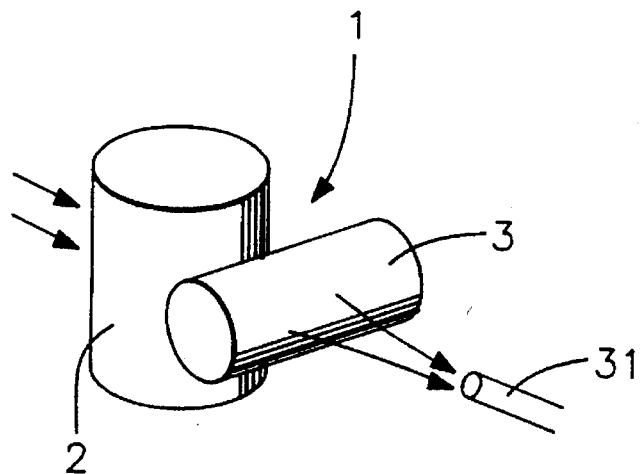
FIGS. 4(a), 4 (b) and 4 (c) are perspective views of three different embodiments of asymmetrical lens of the invention.
Figure 4B:
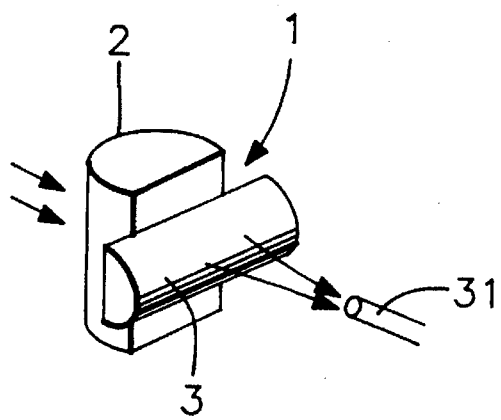
Figure 4C:
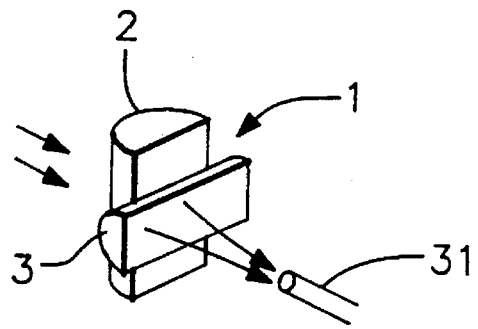

Incidentally, the asymmetrical lens 1 illustrated in FIG. 4(a) comprises lens elements 2 and 3 respectively for vertical and horizontal directions that are in fact cylindrical lenses orthogonally intersecting each other. On the other hand, each of the asymmetrical lenses 1 illustrated in FIGS. 4(b) and 4(c) comprises semicylindrical lens elements 2 and 3, respectively, for vertical and horizontal directions, said lens elements orthogonally intersecting each other.

The number of lens elements constituting an asymmetrical lens according to the invention is not limited to two and three or more than three lens elements may alternatively be used.

While the optical characteristics of any of the above described embodiments of asymmetrical lens of the present invention are defined by the surface planes of the lens that are curved and spherical (arcuate plane, spherical plane), nonspherical surface planes may be employed for the asymmetrical lens if the effects of the wavefront aberration of the lens and the astigmatism of the semiconductor laser device are properly compensated.

The optical characteristics of the asymmetrical lens may additionally be defined in terms of one or more than one dopants that are added to the lens in order to provide it with a distribution of refractive index that can be made equivalent to the one given rise to by the curved surface planes of a lens.

Needless to say, the use of an asymmetrical lens according to the present invention is not limited to coupling a semiconductor laser device and an optical fiber and such a lens may be used for coupling optical waveguides of any type.

Figure 5A:
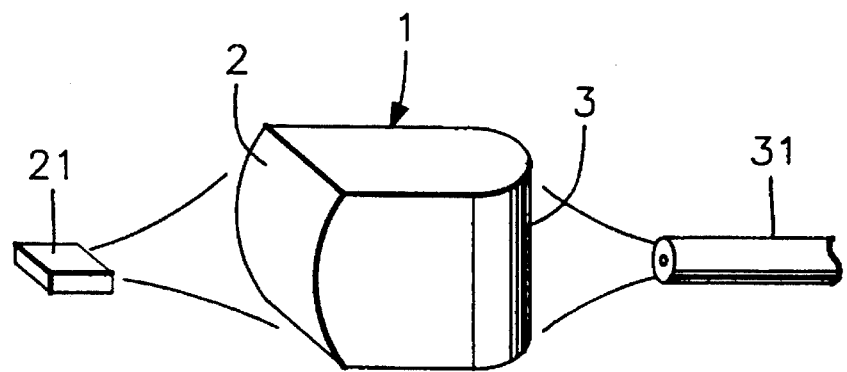
FIGS. 5(a), 5(b) and 5(c) are respectively perspective, side and plan views of another exemplary lens device incorporating an asymmetrical lens according to the invention.
Figure 5B:
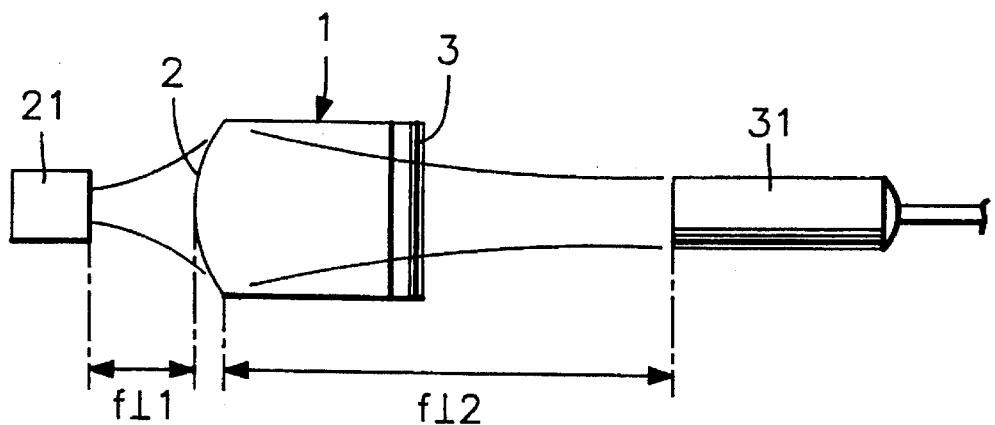
Figure 5C:
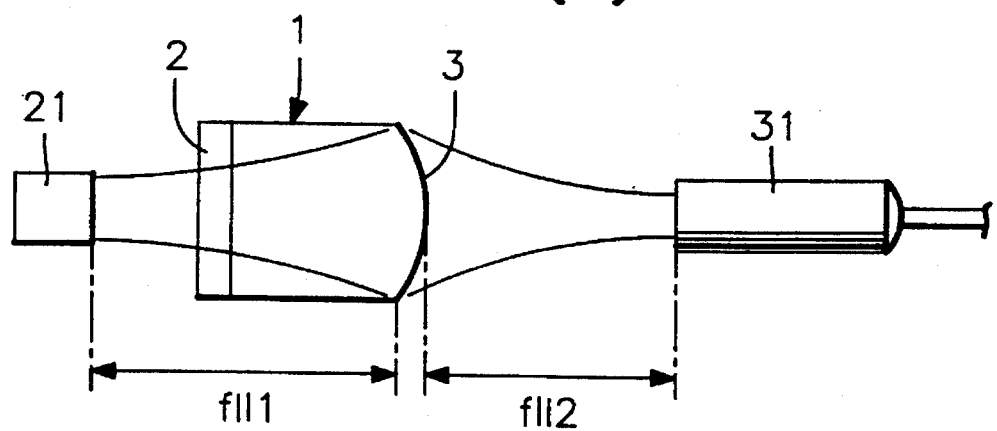

An optical coupling lens device as illustrated in FIGS. 5(a) through 5(c) comprises an asymmetrical lens 1 according to the present invention but does not have an ordinary lens and only the asymmetrical lens 1 is arranged on the optical axis running between a light source (semiconductor laser device) 21 and a single mode optical fiber 31.

The asymmetrical lens 1 of FIGS. 5(a) through 5(c) has a configuration similar to that of any of the preceding embodiments except that it takes a substantially prismatic outer form and comprises lens elements 2 and 3, respectively, for vertical and horizontal directions.

Referring to FIGS. 5(a) through 5(c), bundled beams of light emitted from the light source 21 and collectively having an elliptic cross section are made incident directly upon the asymmetrical lens 1, where they are made to show a circular spot, and then, after passing through the lens 1, introduced into the optical fiber 31.

Thus, it may be evident that an optical coupling lens device as illustrated in FIGS. 5(a) through 5(c) is as effective as the preceding embodiments in optically coupling optical waveguides.

Note that vertical and horizontal directions (⊥)and (∥)as referred to above for the purpose of the present invention are used not in absolute terms but in relative terms.

In other words, any reference to vertical and horizontal directions (⊥) and (∥) in this specification with regard to an asymmetrical lens according to the invention may be reversibly exchanged with each other without substantially affecting the operation and the effect of the lens.

Industrial Applicability

Since the asymmetry of an asymmetrical lens according to the invention is clearly defined by a given simultaneous system of equations, it can be effectively used to optically couple optical waveguides with a low optical loss level if the optical waveguides operate with different waveguide modes, if the waveguide modes of the optical waveguides are not similar relative to one another, if the optical waveguides have mutually different sets of optical characteristics or even if the optical waveguides show astigmatism in their respective radiation patterns.

Thus, an asymmetrical lens according to the invention can meet rigorous requirements for coupling optical waveguides with a low optical loss level in the field of optical telecommunications and therefore such lenses can be effectively used to enhance the quality of high-speed optical telecommunications networks.

What is claimed is:

1. An asymmetrical lens showing different sets of optical characteristics as projected on two planes that are parallel to the optical axis of the lens and perpendicular to each other and satisfying the following simultaneous system of equations:

$$(w\bot 2)/(w\bot 1)=(f\bot 2)/f\bot 1) \quad [2]$$

$$(w\|2)/(w\|1)=(f\|2)/(f\|1) \quad [3]$$

$$(d1)=\bot|(s\bot 1)-(s\|1)| \quad [4]$$

$$(d2)=|(s\perp 2)-(s\|2)| \quad [5]$$

$$(1/f\perp)=(1/f\perp 1)+(1/f\perp 2) \quad [6]$$

$$(1/f\|)=(1/f\|1)+(1/f\|2) \quad [7]$$

where, (f⊥1) and (f⊥2) respectively represent the distances between the two principal surface planes of the lens as projected on one of the planes and the image forming spot, being a symbol indicating a vertical direction, (s⊥1) and (s⊥2) respectively represent work distances corresponding to the above distances, (f∥1) and (f∥2) respectively represent the distances between the two principal surface planes of the lens as projected on the other plane and the image forming spot, being a symbol indicating a horizontal direction, (s∥1) and (s∥2) respectively represent work distances corresponding to the above distances, (w⊥1) and (w⊥2) respectively represent the major and minor axes of the image forming spots having elliptic and/or circular forms on light emitting terminals of optical waveguides connected by way of the lens for matching of their respective waveguide modes, (d1) and (d2) respectively represents the degrees of astigmatism of the optical waveguides connected by way of the lens, (f⊥) and (f∥) respectively represent the focal lengths for vertical and horizontal directions of the lens, and symbols "⊥" and "∥" respectively representing the vertical and horizontal directions.

2. An asymmetrical lens showing different sets of optical characteristics as projected on two planes that are parallel to the optical axis of the lens and perpendicular to each other and satisfying the following simultaneous system of equations:

$$(w\perp 2)/(w\perp 1)=(f\perp 2)/(f\perp 1) \quad [2]$$

$$(w\|2)/(w\|1)=(f\|2)/(f\|1) \quad [3]$$

$$(d1)=|(s\perp 1)-(s\|1)| \quad [4]$$

$$(d2)=|(s\perp 2)-(s\|2)| \quad [5]$$

where, (f⊥1) and (f⊥2) respectively represent the distances between the two principal surface planes of the lens as projected on one of the planes and the image forming spot, being a symbol indicating a vertical direction, (s⊥1) and (s⊥2) respectively represent work distances corresponding to the above distances, (f∥1) and (f∥2) respectively represent the distances between the two principal surface planes of the lens as projected on the other plane and the image forming spot (beam waist), being a symbol indicating a horizontal direction, (s∥1) and (s∥2) respectively represent work distances corresponding to the above distances, (w⊥1) and (w⊥2) respectively represent the major and minor axes of the image forming spots having elliptic and/or circular forms on light emitting terminals of the optical waveguides connected by way of the lens for matching of their respective waveguide modes and (d1) and (d2), respectively, represents the degree of astigmatism of the optical waveguides connected by way of the lens.

3. An asymmetrical lens according to claim 1, wherein two sets of optical characteristics of the lens as projected on two respective planes that are parallel to the optical axis of the lens and perpendicular to each other differ from each other as a function of the configuration of the lens.

4. An asymmetrical lens according to claim 2, wherein two sets of optical characteristics of the lens as projected on two respective planes that are parallel to the optical axis of the lens and perpendicular to each other differ from each other as a function of the distribution of index of refraction of the lens.

5. An asymmetrical lens according to claim 2, wherein two sets of optical characteristics of the lens as projected on two respective planes that are parallel to the optical axis of the lens and perpendicular to each other differ from each other as a function of the configuration and the distribution of index of refraction of the lens.

* * * * *